I. L. LANDIS.

Improvement in Fences.

No. 5,511. Reissued July 29, 1873.

Witnesses:

G. Mattys.

John O'Kennon

Inventor:

Israel L. Landis

PER

Attorneys.

UNITED STATES PATENT OFFICE.

ISRAEL L. LANDIS, OF LANCASTER, PENNSYLVANIA.

IMPROVEMENT IN FENCES.

Specification forming part of Letters Patent No. 129,837, dated July 23, 1872; reissue No. 5,511, dated July 29, 1873; application filed June 26, 1873.

*To all whom it may concern:*

Be it known that I, ISRAEL L. LANDIS, of Lancaster, in the county of Lancaster and State of Pennsylvania, have invented certain new and useful Improvements in Fences; and I do hereby declare that the following is a full, clear, and exact description thereof that will enable others skilled in the art to which it appertains to make and use the same, reference being had to the accompanying drawings and to the letters of reference marked thereon, which form a part of this specification.

The nature of my invention consists in pins that pass horizontally through the posts and support the panels in an upright position to prevent the panels being raised by small stock in their efforts to pass under the same, all as will be hereinafter fully explained.

Figure 1:
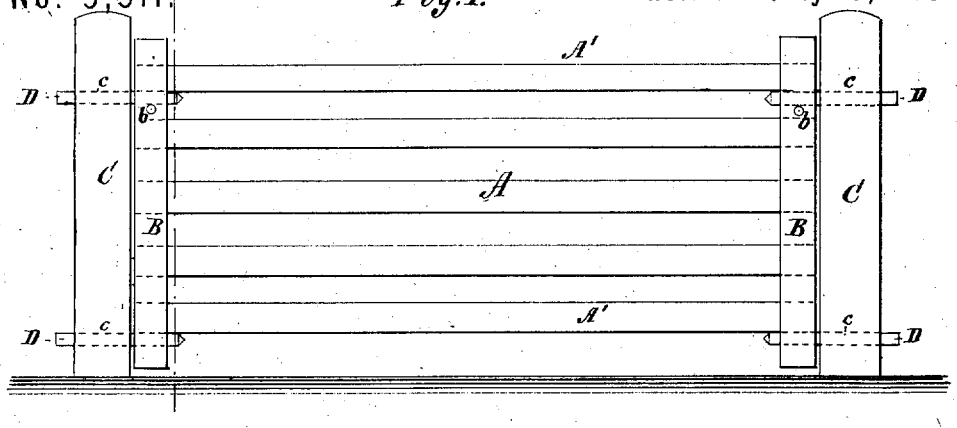
Figure 2:
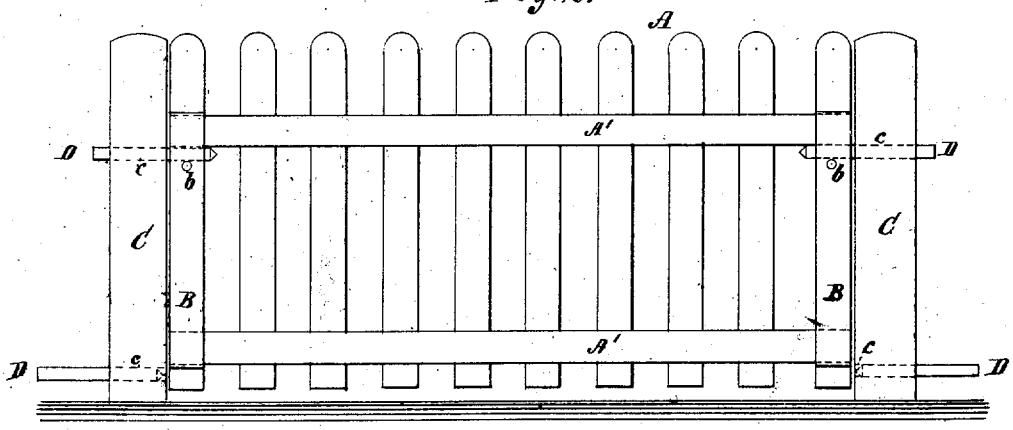
Figure 3:
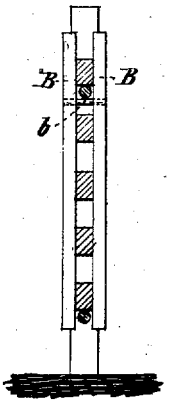

Figures 1 and 2 are side views of a fence illustrating my invention. Fig. 3 is a transverse section.

A in the drawing represents a fence-panel, which may have longitudinal rails, as shown in Fig. 1, or vertical rails or palings, as shown in Fig. 2. At the ends of each panel are posts B B, which are firmly attached to the longitudinal pieces. C is a post, which may be formed of any kind or character of wood. Through this are bored two horizontal holes, *c c*, one near the upper and the other near the lower end. D D are bolts, formed of metal or wood, and passed through the holes *c c*, and made to support the panel. These bolts D pass into suitable spaces, orifices, or receptacles, made in or forming a part of the panel-post B B, which are of such a size that they correspond with the size of the bolts or pins D D.

After the pins or bolts have been passed through the fence-panels the panels cannot be raised by small stock to allow their outward or inward passage under the fence.

By passing pins *b b* transversely a short distance under the horizontal board of each panel a suitable space is formed to accomplish the result I design to effect.

By this construction the pins can be simply withdrawn and a single or all the panels readily removed; or, by simply detaching the lower pins, a panel becomes a flood-gate; and, finally, with all these advantages, it is preeminently a cheap fence.

I am aware of the patent for a fence granted to S. H. Rose, September 25, 1866, wherein pins pass transversely through the fence-posts and into slots arranged in the ends of the removable fence-panels, which latter rest on the ground and are not supported by the transverse pins; hence I disclaim the use of pins passing through the fence-posts under the panels of a portable fence as being, broadly, my invention.

With my invention the fence-panels cannot be raised upward by small stock.

Having thus fully described my invention, what I claim as new, and desire to secure by Letters Patent, is—

The combination of the perforated posts C, the removable fence-sections having posts B with receptacles, and the pins D passing through the perforated posts and into the receptacles, for supporting the sections and preventing the raising and lowering of the same by small animals.

In testimony that I claim the foregoing I have hereunto set my hand this 9th day of June, 1873.

Witnesses: ISRAEL L. LANDIS.
WM. B. WILEY,
A. N. MARR.